United States Patent Office 2,759,810
Patented Aug. 21, 1956

2,759,810

ARTICLES OF SINTERED IRON AND METHOD OF MAKING SAME

Max Koehler, Herbede (Ruhr), Germany

No Drawing. Application October 2, 1951,
Serial No. 249,405

Claims priority, application Germany October 20, 1950

5 Claims. (Cl. 75—123)

The present invention relates to sintered iron and, more particularly, to improved hollow and solid articles made of sintered iron and a method of making the same.

In order to make work pieces subjected to slide friction, it is known to add graphite and a heavy metal to iron powder and to compress the powder-like mixture of iron, graphite and a heavy metal, preferably lead, whereupon the thus shaped work piece is subjected to sintering. The employment of this method results in the production of work pieces having a high yield point if, after the customary pressing and sintering operation, a mechanical compression is effected while simultaneously pressures of at least three tons per square centimeter and temperatures of 800° centigrade are applied. The mixture has a lead content of preferably not less than 2%. An addition of lead above 10% is in most instances not economic.

With these known methods of making work pieces of sintered iron, the dimensioning of the work pieces is dependent on the conditions of the press which works with high pressures. With tubes or bushings, as a rule, the length must not materially exceed the diameter. Furthermore, in many instances, the unfinished or unworked work piece or pig made according to the heretofore known methods by pressing still requires a costly after-treatment by cutting tools.

It is, therefore, an object of the present invention to provide an improved method of making work pieces of sintered iron, which will overcome the above mentioned drawbacks.

It is another object of this invention to provide a method of making work pieces of sintered iron which will make an after-treatment of the molded article unnecessary.

It is also an object of this invention to provide a method of making articles from sintered iron which will make it possible to produce tubes or pipes of relatively great length with regard to the diameter thereof.

A still further object of this invention consists in the provision of a method of the type set forth in the preceding paragraphs which will yield a product of increased wear resistance and increased tensile strength with regard to sintered iron products heretofore known.

It is still another object of this invention to provide tubes or pipes of sintered iron which will be highly corrosion resistant.

These and other objects and advantages of the invention will appear more clearly from the following description and the examples contained therein.

The present invention is based on the rather surprising finding that it is possible to extrusion press into hollow or solid articles of great length an unfinished work piece or pig which consists of iron alloyed with lead and has been shaped by compressing the same followed by a sintering process. In this connection, it is to be understood that the term "hollow articles" also comprises articles such as bushings, sleeves, etc.

For the sake of completeness it may be mentioned that it has been known heretofore to produce seamless tubes from pigs of cast iron or iron alloys by extruding such pigs from extrusion presses. With such extrusion presses, a pig enclosed in a recipient is subjected to high pressure and is deformed or molded by forcing a mandrel through a die. Depending on the shape of the mandrel and the die, hollow cylindrical bodies such as tubes or pipes but also articles of other profiles may be made. This known method of making seamless tubes differs, however, from the present invention fundamentally in as much as the material subjected in this instance to extrusion molding has nothing to do with the material used in the process according to the present invention. As a matter of fact, the results heretofore obtained with extrusion presses had led to the definite conclusion that lead alloyed sintered products could not be extrusion molded since it had to be expected that with the high molding temperature of extrusion presses, the lead present in vapor form would spring the grain limits and thus prevent the manufacture of coherent hollow or solid articles. However, extensive tests have proved that lead added to the iron powder, preferably in quantities of from 0.1 to 10% by weight, has a highly favorable effect during the pressing and molding operation so that, as a rule and in contrast to the known method of extrusion pressing of pipes, no special lubricating means have to be added. The structure lead-iron-carbon is transformed during the extrusion process in a manner which is similar to the after-treatment of lead alloyed sintered iron referred to above in the opening paragraphs of this description, particularly since in the extrusion presses also pressures and temperatures occur which are higher than those employed for the above mentioned after-treatment, i. e. pressures higher than 3 tons per sq. centimeter and temperatures higher than 800° centigrade.

According to a further development of the invention, the unfinished work piece or pig is provided with a cover of graphite. As a result thereof, when the thus treated pig is being molded or processed in the extrusion press, an inner and outer peripheral layer enriched with graphite and lead is formed. Such peripheral layers are resistant against the attack of many chemicals. Consequently, tubes or pipes made according to the present invention may advantageously be employed for treating and conveying aggressive liquids. Thus, such tubes or pipes may be used as high pressure conduits for thermic cracking processes, for hydration, in pipe stills for heating oil of a high boiling point, in heat exchangers in which aggressive liquids are treated, and for many other purposes where corrosion resistance is important. On the other hand, such work pieces having a surface layer enriched with graphite and lead, when subjected to slide friction, have particularly good running features.

It has been found that, when molding the unfinished work piece or pig to hollow or solid articles of great length, the crystal structure of the pig transforms during the shaping under heat into a longitudinal fiber of the hollow or solid article. In this way, the work piece acquires a materially increased extensibility.

If desired, there may be added to the lead alloyed sintered iron also limited quantities of other heavy metals, e. g. zinc, antimony, manganese, nickel, or copper.

Since according to the extrusion method it is possible to make hollow or solid articles of practically unlimited length, it has by the present invention been made possible to produce bearing sleeves of lead alloyed sintered iron. The processing in the extrusion press permits to observe very small tolerances. Also short pieces such as bearing bushings or slide rings may, therefore, economically be produced by cutting off corresponding pieces from the extruded product according to the invention.

While it is not intended to limit the method according to the present invention to the manufacture of any specific sintered iron products, it may be mentioned that the method according to the present invention is of particular advantage in connection with the manufacture of gears, cylindrical bearing sleeves, sleeves for the protection of shafts, ball pivots, pivot nuts, worm gear rings, spring bushings, intermediate layers of supporting springs, bushings for piston pins, ball sockets, wear bolts as used for intance in Gall's chains, safety bolts as used for instance in the drives of break down tools or equipment such as crushers. Such bolts have frequently also to carry out a rotating movement. The method according to the present invention is furthermore applicable to the manufacture of armatures of all types and is especially advantageous for the manufacture of drilling tools which have to possess great hardness.

It may be added that, if for special reasons a further treatment or refining of the parts made according to the present invention is desired, this can be effected without any difficulties. The values of strength are to be adapted to the respective field of application. It is possible with articles made according to the present invention to obtain a Rockwell hardness of up to 65 units.

Further details of the present invention will become apparent from the following:

EXAMPLES

Test I

An iron powder for use in connection with the present invention was selected with the following mesh analysis:

| | Per cent |
|---|---|
| Mesh width larger than 0.2 to 0.3 millimeter | 10 |
| Mesh width between 0.2 and 0.1 millimeter | 30 |
| Mesh width between 0.1 and 0.06 millimeter | 42 |
| Mesh width below 0.06 millimeter | 18 |

To this powder was added: 1% graphite (with an ash content of 15%) and 5% special lead powder.

Test II

To the mixture of Test I was added 2½% Ni.

In both instances, Test I and Test II, the mixed powder was subjected to a briquetting process at a pressure of 5 tons per sq. centimeter. This was followed by a sintering operation carried out at a temperature of 1100° centigrade in a neutral furnace atmosphere for a period of three hours. The analysis of the thus produced unfinished work pieces or pigs disclosed the following composition:

Test I (without Ni):

| | Per cent |
|---|---|
| C | 0.59 |
| Si | 0.16 |
| Mn | 0.17 |
| P | 0.029 |
| Sn | 0.24 |
| Cu | 0.3 |
| Pb | 3.62 |
| Remainder Fe. | |

Test II (with Ni):

| | Per cent |
|---|---|
| C | 0.61 |
| Si | 0.17 |
| Mn | 0.16 |
| P | 0.027 |
| Sn | 0.29 |
| Cu | 0.54 |
| Pb | 3.45 |
| Ni | 2.38 |
| Remainder Fe. | |

The specific weight of these unfinished work pieces or pigs was 6.3 kilograms per cubic decimeter. These unfinished work pieces or pigs were then heated to approximately 1000° centigrade and extrusion pressed. The dimensions and data of the unfinished work pieces or pigs were as follows:

| | |
|---|---|
| Outer diameter | 46.5 millimeters. |
| Inner diameter | 27.00 millimeters. |
| Length | 90.00 millimeters. |
| Weight | 0.64 kilograms. |

The thus extruded products had the following dimensions and data:

| | |
|---|---|
| Outer diameter | 37.00 millimeters. |
| Inner diameter | 27.00 millimeters. |
| Length | 160.00 millimeters. |
| Specific weight | 8.00 kilograms per cubic decimeter. |
| Deformation ratio | 1:2.3. |
| Applied pressure | Approximately 2.9 tons per sq. centimeter. |

The analysis of a sample piece cut out of the core of the extruded products furnished the following data:

Test I (without Ni):

| | Per cent |
|---|---|
| C | 0.59 |
| Si | 0.16 |
| Mn | 0.17 |
| P | 0.029 |
| Sn | 0.24 |
| Cu | 0.3 |
| Pb | 2.9 |
| Remainder Fe. | |

Test II (with Ni):

| | Per cent |
|---|---|
| C | 0.61 |
| Si | 0.17 |
| Mn | 0.16 |
| P | 0.027 |
| Sn | 0.29 |
| Cu | 0.54 |
| Pb | 2.83 |
| Ni | 2.38 |
| Remainder Fe. | |

The extruded sample pieces did not show any brittleness in transverse direction, while they had a very smooth surface. According to these results, it is possible, e. g. with a 250 ton press to obtain the following pipe lengths:

PIG OR HOLLOW BLOCK "A"

| | |
|---|---|
| Outer diameter | 80.00 millimeters. |
| Inner diameter | 34.00 millimeters. |
| Length | 96.00 millimeters. |
| Specific weight | 6.3 kilograms per cubic decimeter. |

EXTRUDED PIPE "A"

| | |
|---|---|
| Outer diameter | 40.00 millimeters. |
| Inner diameter | 32.00 millimeters. |
| Wall thickness | 4.00 millimeters. |
| Length | Approximately 700.00 millimeters. |
| Specific weight | Approximately 8.0 kilograms per cubic decimeter. |
| Deformation ratio | 1:9.2. |
| Theoretical pressure | Approximately 4 tons per sq. centimeter. |

PIG OR HOLLOW BLOCK "B"

| | |
|---|---|
| Outer diameter | 100.00 millimeters. |
| Inner diameter | 52.00 millimeters. |
| Length | 120.00 millimeters. |
| Specific weight | 6.3 kilograms per cubic decimeter. |

EXTRUDED PIPE "B"

| | |
|---|---|
| Outer diameter | 60.00 millimeters. |
| Inner diameter | 50.00 millimeters. |
| Wall thickness | 5.00 millimeters. |
| Length | Approximately 630.00 millimeters. |
| Specific weight | Approximately 8 kilograms per cubic decimeter. |
| Deformation ratio | 1:6.8 |
| Theoretical pressure | Approximately 3.6 tons per sq. centimeter. |

What I claim is:

1. A method of making hollow and solid articles, which includes the steps of adding to iron powder approximately 1% by weight of graphite and approximately 5% by weight of lead powder, compressing the thus obtained mixture at a pressure of approximately 5 tons per sq. centimeter, sintering the thus compressed material at substantially 1100° centigrade for a period of approximately 3 hours, thereby producing a billet, and extrusion pressing the said billet into an article of desired shape.

2. A method of making hollow and solid articles, which includes the steps of: adding to iron powder approximately from 0.6 to 1% by weight of graphite, from 2 to 10% by weight of lead powder, compressing the thus obtained mixture at a pressure of at least 3000 tons per square centimeter, sintering the thus compressed material at a temperature of at least 1000° C. for a period of approximately 3 hours, thereby producing a billet, and extrusion pressing the said billet into an article of desired shape.

3. As a new article of manufacture, an extrusion pressed article of perlitic structure containing from 2 to 10% by weight of lead, approximately from 0.6 to 1% by weight of graphite, and the remainder iron with impurities, the specific weight of said article being approximately 8 kilograms per cubic decimeter.

4. As a new article of manufacture, an extrusion pressed article of perlitic structure containing from 2 to 10% by weight of lead, approximately from 0.6 to 1% by weight of graphite, from 0.5 to 5% by weight of nickel, and the remainder iron with impurities, the specific weight of said article being approximately 8 kilograms per cubic decimeter.

5. As a new article of manufacture, an extrusion pressed article of perlitic structure having a peripheral layer of graphite and containing from 2 to 10% by weight of lead, from 0.6 to 1% by weight of graphite, and the remainder iron with impurities.

References Cited in the file of this patent

UNITED STATES PATENTS

| Number | Name | Date |
|---|---|---|
| 1,775,358 | Smith | Sept. 9, 1930 |
| 1,822,939 | Stout | Sept. 15, 1931 |
| 1,896,939 | Calkins | Feb. 7, 1933 |
| 2,045,786 | Lorant | June 30, 1936 |
| 2,097,502 | Southgate | Nov. 2, 1937 |
| 2,123,416 | Graham | July 12, 1938 |
| 2,148,040 | Schwarzkopf | Feb. 21, 1939 |
| 2,182,759 | Harder | Dec. 5, 1939 |
| 2,187,086 | Koehing | Jan. 16, 1940 |
| 2,214,104 | Shaw | Sept. 10, 1940 |
| 2,225,424 | Schwarzkopf | Dec. 17, 1940 |
| 2,225,902 | Cartwright | Dec. 24, 1940 |
| 2,299,192 | Tormyn | Oct. 20, 1942 |
| 2,327,805 | Koehring | Aug. 24, 1943 |
| 2,353,951 | Wood | July 18, 1944 |
| 2,422,439 | Schwarzkopf | June 17, 1947 |
| 2,452,628 | Bartlett | Nov. 2, 1948 |
| 2,477,601 | Hanson | Aug. 2, 1949 |